(12) United States Patent
Odamura

(10) Patent No.: US 7,245,256 B2
(45) Date of Patent: Jul. 17, 2007

(54) GPS POSITION-FINDING SYSTEM AND METHOD OF FINDING POSITION OF GPS TERMINAL

(75) Inventor: Satoshi Odamura, Tokyo (JP)

(73) Assignee: NEC Corporation, Tokyo (JP)

( * ) Notice: Subject to any disclaimer, the term of this patent is extended or adjusted under 35 U.S.C. 154(b) by 281 days.

(21) Appl. No.: 10/980,825

(22) Filed: Nov. 4, 2004

(65) Prior Publication Data
US 2005/0116858 A1 Jun. 2, 2005

(30) Foreign Application Priority Data
Nov. 12, 2003 (JP) ............................. 2003-381889

(51) Int. Cl.
*G01S 1/00* (2006.01)
*H04B 7/185* (2006.01)

(52) U.S. Cl. ................................. 342/357.09

(58) Field of Classification Search .......... 342/357.09, 342/357.03, 357.11, 357.15, 357.02
See application file for complete search history.

(56) References Cited

U.S. PATENT DOCUMENTS 5,210,540 A * 5/1993 Masumoto ............. 342/357.11
6,061,018 A 5/2000 Sheynblat
6,552,681 B1 * 4/2003 Hayward et al. ...... 342/357.06
7,096,233 B2 * 8/2006 Mori et al. .............. 707/104.1
2003/0085838 A1 5/2003 Zhao

FOREIGN PATENT DOCUMENTS

| JP | 4-370711 | 12/1992 |
|----|----------|---------|
| JP | 8-285932 | 11/1996 |
| JP | 2002-351767 A | 12/2002 |

* cited by examiner

*Primary Examiner*—Thomas H. Tarcza
*Assistant Examiner*—Nga X. Nguyen
(74) *Attorney, Agent, or Firm*—Foley & Lardner LLP

(57) ABSTRACT

A position-finding system is comprised of a terminal having a global positioning system (GPS) for finding a position thereof, and a server which calculates altitude data, based on terrain data in an area in which the terminal is. The terminal includes a controller which selects one of three-dimensional position-finding in which a position is calculated through the use of four or more satellites and two-dimensional position-finding in which a position is calculated in a circumference in which only three satellites can be captured, in accordance with the altitude data provided from the server.

35 Claims, 12 Drawing Sheets

GPS POSITION-FINDING SYSTEM AND METHOD OF FINDING POSITION OF GPS TERMINAL

BACKGROUND OF THE INVENTION

1. Field of the Invention

The invention relates to a position-finding system for finding a position of a terminal, a server used in the position-finding system, a mobile terminal used in the position-finding system, a GPS receiver used in the position-finding system, a method of finding a position of a terminal in the position-finding system, and a program for causing a computer to carry out the method.

2. Description of the Related Art

In these years, a global positioning system (GPS) is mounted not only in devices used outdoors such as a car navigation system or a measurement unit, but also in a mobile terminal such as a mobile phone. With popularization of GPS, a device including GPS is required to have higher sensitivity and accuracy.

In a conventional method of finding a position of something through the use of GPS, a position was measured only with GPS. In contrast, there has been suggested a method of finding a position of something through the use of GPS, including the step of receiving preliminary or assistant data such as navigation message received from a satellite, through a network.

When a small terminal such as a mobile phone is used for finding a position thereof through the use of GPS, it is often impossible to capture a satellite, for instance, if the terminal is surrounded by buildings or the terminal is used indoors. Thus, it is requested that a position of a user of a terminal can be found, even if it is difficult for the terminal to capture a satellite.

In a method of finding a position of a terminal having GPS, four or more satellites are usually used. If a terminal can capture only three satellites, it would be necessary for the terminal to receive assist data comprised of data indicative of an altitude of the terminal, in which case, accuracy of the altitude data exerts serious influence on accuracy of a position found by the method.

A terminal having conventional GPS cannot receive altitude data. Hence, if the terminal can capture only three satellites, the terminal carries out two-dimensional position-finding on the assumption that an altitude of the terminal is equal to a predetermined altitude. Thus, if an actual altitude of the terminal is highly different from the predetermined altitude, a position of the terminal could be found with small accuracy, that is, the result of position-finding is accompanied with a significant error.

Recently, there have been suggested various methods of finding a position of a terminal at high speed by receiving assistant data from a server existing in a network.

For instance, Japanese Patent Application Publication No. 2002-351767 has suggested a method of displaying a contracted map in a display screen of a mobile terminal. The suggested method includes the steps of receiving positional data of the mobile terminal through the use of GPS, receiving a contracted map from a map server in accordance with the received positional data, and automatically selecting a scale of a map in accordance with accuracy of the positional data.

Japanese Patent Application Publication No. 4-370711 has suggested a method of finding an automobile through the use of GPS, including the steps of storing altitude data of nodes defining roads, into map data, receiving altitude data from the map data, corresponding to a position of an automobile detected by a navigation detector, if three-dimensional position-finding by GPS cannot be carried out, and calculating a current position of an automobile by carrying out two-dimensional position-finding through the use of the received altitude data.

Japanese Patent Application Publication No. 8-285932 has suggested a GPS receiver comprised of an antenna through which data signals are received from a GPS satellite, a demodulator for demodulating the received data signals, a digital map including altitude data, a reader for reading the altitude data out of the digital map, a calculator for calculating a position, a velocity vector and a current time of the GPS receiver, based on the demodulated data signals, the altitude data, and a difference between estimated time of the GPS receiver and time of the GPS satellite, a display for displaying the calculation results, and a unit for estimating time gap, based on data of past time gap. If data about time gap cannot be received from the GPS satellite, the unit compensates for the data received from the GPS satellite.

However, a fixed altitude is often used as altitude data in a base station or a cell, and accordingly, such fixed altitude is often quite different from an actual altitude in dependence on terrain.

SUMMARY OF THE INVENTION

In view of the above-mentioned problems in the conventional GPS systems, it is an object of the present invention to provide a position-finding system for finding a position of a terminal, which is capable of preventing reduction in accuracy in finding a position.

It is also an object of the present invention to provide a server used in the position-finding system, a mobile terminal used in the position-finding system, a GPS receiver used in the position-finding system, a method of finding a position of a terminal in the position-finding system, and a program for causing a computer to carry out the method, all of which are capable of preventing reduction in accuracy in finding a position.

Hereinbelow are described a position-finding system for finding a position of a terminal, a server used in the position-finding system, a mobile terminal used in the position-finding system, a GPS receiver used in the position-finding system, a method of finding a position of a terminal in the position-finding system, and a program for causing a computer to carry out the method, all in accordance with the present invention through the use of reference numerals used in later described embodiments. The reference numerals are indicated only for the purpose of clearly showing correspondence between claims and the embodiments. It should be noted that the reference numerals are not allowed to interpret of claims of the present application.

In one aspect of the present invention, there is provided a position-finding system including a terminal (1) having a global positioning system (GPS) for finding a position thereof, and a server (4) which calculates an altitude, based on terrain data in an area in which the terminal (1) is, wherein the terminal (1) includes a controller (14) which selects one of three-dimensional position-finding in which a position is calculated through the use of four or more satellites and two-dimensional position-finding in which a position is calculated in a circumference in which only three satellites can be captured, in accordance with the altitude data provided from the server (4).

For instance, the server (4) is comprised of a first device (44) which acquires information relating to a plurality of base stations/cells which are captured by the terminal (1), and a second device (45, 46) which makes altitude data relating to an area covered by the plurality of base stations/cells.

The server (4) may further include a third device which calculates a profile of altitude in an area, based on the terrain data, and makes accuracy/variance data indicative of accuracy or variance of the altitude data, based on the profile of altitude.

For instance, the controller (14) selects one of the three-dimensional position-finding and the two-dimensional position-finding in accordance with whether there is the altitude data or not.

For instance, the controller (14) selects one of the three-dimensional position-finding and the two-dimensional position-finding in accordance with accuracy of the altitude data.

It is preferable that the controller (14) judges accuracy of the altitude data, based on predetermined standard, and selects one of the three-dimensional position-finding and the two-dimensional position-finding in accordance with the result of judgment.

For instance, the controller (14) uses a difference between the altitude data and maximum or minimum altitude in a cell in which the terminal (1) is, as the predetermined standard.

It is preferable that the controller (14) selects the three-dimensional position-finding when a position of the terminal (1) is to be found only by the global positioning system.

For instance, the terminal (1) is comprised of a mobile phone.

In another aspect of the present invention, there is provided a server (4) constituting a position-finding system together with a terminal (1) having a global positioning system (GPS) for finding a position thereof, wherein the server (4) calculates altitude data, based on terrain data in an area in which the terminal (1) is, and the terminal (1) selects one of three-dimensional position-finding in which a position is calculated through the use of four or more satellites and two-dimensional position-finding in which a position is calculated in a circumference in which only three satellites can be captured, in accordance with the altitude data provided from the server (4).

For instance, the server (4) is comprised of a first device (44) which acquires information relating to a plurality of base stations/cells which are captured by the terminal (1), and a second device (45, 46) which makes altitude data relating to an area covered by the plurality of base stations/cells.

It is preferable that the server (4) includes a third device which calculates a profile of altitude in an area, based on the terrain data, and makes accuracy/variance data indicative of accuracy or variance of the altitude data, based on the profile of altitude.

In still another aspect of the present invention, there is provided a mobile terminal (1) having a global positioning system (GPS) for finding a position thereof, including a controller (14) which selects one of three-dimensional position-finding in which a position is calculated through the use of four or more satellites and two-dimensional position-finding in which a position is calculated in a circumference in which only three satellites can be captured, in accordance with altitude data calculated based on terrain data in an area in which the mobile terminal (1) is located.

For instance, the controller (14) selects one of the three-dimensional position-finding and the two-dimensional position-finding in accordance with whether there is the altitude data or not.

For instance, the controller (14) selects one of the three-dimensional position-finding and the two-dimensional position-finding in accordance with accuracy of the altitude data.

It is preferable that the controller (14) judges accuracy of the altitude data, based on predetermined standard, and selects one of the three-dimensional position-finding and the two-dimensional position-finding in accordance with the result of judgment.

For instance, the controller (14) uses a difference between the altitude data and maximum or minimum altitude in a cell in which the terminal (1) is, as the predetermined standard.

It is preferable that the controller (14) selects the three-dimensional position-finding when a position of the mobile terminal (1) is to be found only by the global positioning system.

For instance, the mobile terminal (1) is comprised of a mobile phone.

In yet another aspect of the present invention, there is provided a GPS receiver (1) having a global positioning system (GPS) for finding a position thereof, including a controller (14) which selects one of three-dimensional position-finding in which a position is calculated through the use of four or more satellites and two-dimensional position-finding in which a position is calculated in a circumference in which only three satellites can be captured, in accordance with altitude data calculated based on terrain data in an area in which the GPS receiver is.

For instance, the controller (14) selects one of the three-dimensional position-finding and the two-dimensional position-finding in accordance with whether there is the altitude data or not.

For instance, the controller (14) selects one of the three-dimensional position-finding and the two-dimensional position-finding in accordance with accuracy of the altitude data.

It is preferable that the controller (14) judges accuracy of the altitude data, based on predetermined standard, and selects one of the three-dimensional position-finding and the two-dimensional position-finding in accordance with the result of judgment.

For instance, the controller (14) uses a difference between the altitude data and maximum or minimum altitude in a cell in which the terminal (1) is, as the predetermined standard.

For instance, the controller (14) selects the three-dimensional position-finding when a position of the GPS receiver is to be found only by the global positioning system.

In still yet another aspect of the present invention; there is provided a method of finding a position of a terminal (1) in a position-finding system comprised of the terminal (1) and a server (4), the terminal (1) including a global positioning system (GPS) for finding a position thereof, and a controller (14) which selects one of three-dimensional position-finding in which a position is calculated through the use of four or more satellites and two-dimensional position-finding in which a position is calculated in a circumference in which only three satellites can be captured, the method including (a) calculating altitude data, based on terrain data in an area in which the terminal (1) is, the step (a) being to be carried out by the server (4), and (b) selecting one of the three-dimensional position-finding and the two-dimensional position-finding in accordance with the altitude data, the step (b) being to be carried out by the terminal (1).

For instance, the three-dimensional position-finding and the two-dimensional position-finding is selected in the step (b) in accordance with whether there is the altitude data or not.

For instance, the three-dimensional position-finding and the two-dimensional position-finding is selected in the step (b) in accordance with accuracy of the altitude data.

The method may further include (c) judging accuracy of the altitude data, based on predetermined standard, and wherein the three-dimensional position-finding and the two-dimensional position-finding is selected in the step (b) in accordance with the result of judgment.

For instance, a difference between the altitude data and maximum or minimum altitude in a cell in which the terminal (1) is located is used as the predetermined standard.

It is preferable that the three-dimensional position-finding is always selected in the step (b) when a position of the terminal (1) is to be found only by the global positioning system.

In further another aspect of the present invention, there is provided a program for causing a controller (14) equipped in a terminal (1) to find a position thereof in a position-finding system comprised of the terminal (1) and a server (4), the terminal (1) including a global positioning system (GPS) for finding a position thereof, the controller (14) selecting one of three-dimensional position-finding in which a position is calculated through the use of four or more satellites and two-dimensional position-finding in which a position is calculated in a circumference in which only three satellites can be captured, the server (4) calculating altitude data, based on terrain data in an area in which the terminal (1) is, steps executed by the controller (14) in accordance with the program including selecting one of the three-dimensional position-finding and the two-dimensional position-finding in accordance with the altitude data provided from the server (4).

For instance, the three-dimensional position-finding and the two-dimensional position-finding is selected in accordance with whether there is the altitude data or not.

For instance, the three-dimensional position-finding and the two-dimensional position-finding is selected in accordance with accuracy of the altitude data.

It is preferable that the steps further include judging accuracy of the altitude data, based on predetermined standard, and wherein the three-dimensional position-finding and the two-dimensional position-finding is selected in accordance with the result of judgment.

For instance, a difference between the altitude data and maximum or minimum altitude in a cell in which the terminal (1) is located is used as the predetermined standard.

It is preferable that the three-dimensional position-finding is always selected when a position of the terminal (1) is to be found only by the global positioning system.

The advantages obtained by the aforementioned present invention will be described hereinbelow.

In accordance with the present invention, a mobile terminal which is designed to be able to carry out two-dimensional and three-dimensional position-finding receives altitude data included in assistant data. The mobile terminal can stop carrying out two-dimensional position-finding in dependence on accuracy of the altitude data, preventing an error in the altitude data from exerting harmful influence on measurement of a position of the mobile terminal.

In accordance with the present invention, two-dimensional position-finding is carried out only when altitude data is expected to have high accuracy, based on terrain data of a cell in which the mobile terminal is. Thus, it would be possible to reduce an error in finding a position of the mobile terminal, caused by a difference between an estimated altitude and an actual altitude of the mobile terminal, ensuring reduction in accuracy in finding a position of the mobile terminal by carrying out two-dimensional position-finding in which only three satellites can be captured.

Since a terminal having conventional GPS cannot receive altitude data, the terminal carries out two-dimensional position-finding on the assumption that an altitude of the terminal is equal to a predetermined altitude. Thus, if an actual altitude of the terminal is highly different from the predetermined altitude, a position of the terminal could be found with small accuracy or a significant error.

In accordance with the present invention, whether two-dimensional or three-dimensional position-finding is carried out is determined in accordance with whether altitude data can be received or whether accuracy of altitude data is within an allowable range. Thus, it is possible to prevent reduction in accuracy in finding a position of the mobile terminal.

In accordance with the present invention, accuracy of altitude data is judged based on terrain data of an area in which the mobile terminal is located. Whether two-dimensional or three-dimensional position-finding is carried out is determined in accordance with the accuracy. Hence, it is possible to prevent reduction in accuracy caused by an error in altitude.

In accordance with the present invention, an area in a cell, in which the mobile terminal is located, is identified, based on data relating to a base station and/or cells, and an altitude of the mobile terminal is estimated based on terrain data of the area. Thus, altitude data could have high accuracy, and accordingly, it is possible to prevent reduction in accuracy in finding a position of the mobile terminal.

The present invention may be applied not only to a mobile phone, but also to a mobile terminal such as a personal digital assistant (PDA), or a GPS receiver equipped in an automobile.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 1:
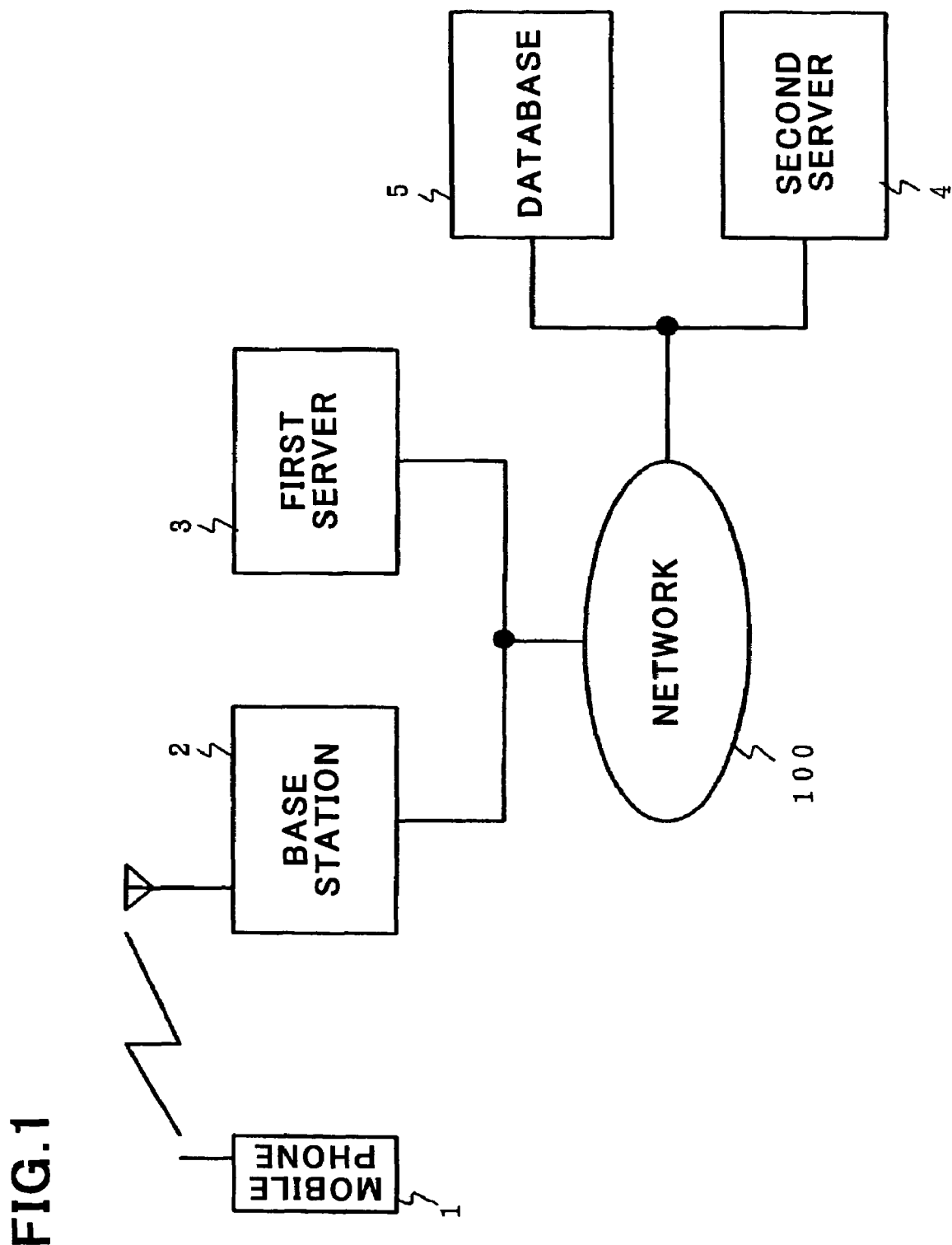
FIG. 1 is a block diagram of a position-finding system in accordance with the first embodiment of the present invention.

FIG. 1 is a block diagram of a position-finding system in accordance with the first embodiment of the present invention.

The position-finding system in accordance with the first embodiment is comprised of a mobile phone 1, a base station 2, a first server 3 for providing data relating to mobile phones, a second server 4 for providing assistant data necessary for finding a position through a global positioning system (GPS), and a database storing terrain data therein.

The base station 2, the first server 3, the second server 4, and the database 5 are designed to be able to make communication with one another through a network 100 such as a public network or Internet.

The mobile phone 1 is designed to have a global positioning system (GPS), and makes communication with the base station 2 through a radio-signal network. The mobile phone 1 makes communication with the second server 4 through the network 100 to receive assistant data from the second server 4.

The database 5 provides data indicative of a position and an altitude of the mobile phone 1, made based on data relating to cells and/or a base station to which the mobile phone 1 is registered, to the second server 4.

For instance, the first embodiment may be applied to various mobile phone systems such as a personal digital cellular (PDC) system, a personal handy-phone system (PHS), a global system for mobile communications (GSM), a general packet radio service (GPRS), a wideband code division multiple access (W-CDMA) system, and a code division multiple access (CDMA) system. Furthermore, the first embodiment may be applied to a system in which communication is made through radio-signal local area network (LAN), Bluetooth, and infra-red ray signals, and further to a system in which communication is made through wires.

Figure 2:
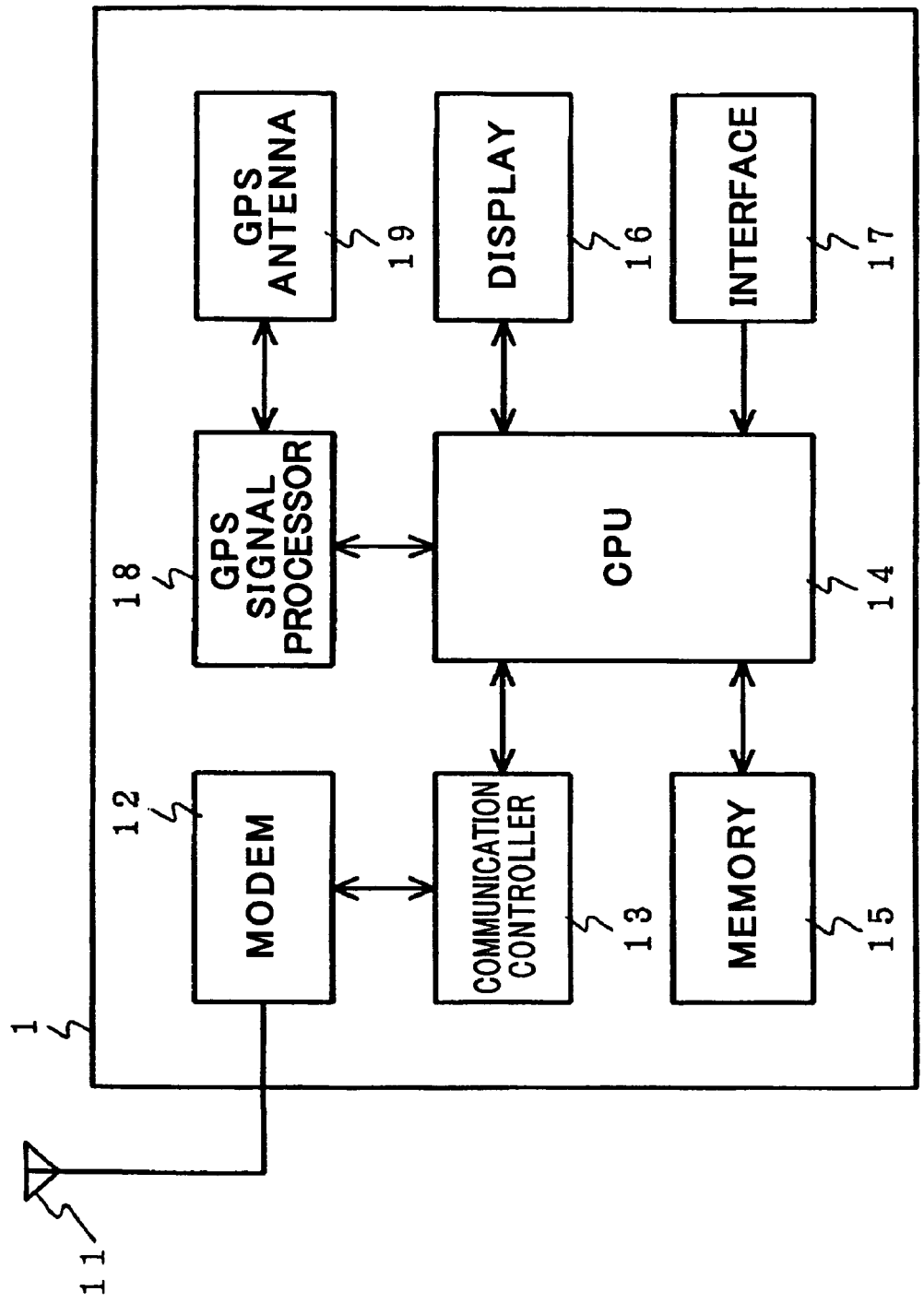
FIG. 2 is a block diagram of a mobile phone used in the system illustrated in FIG. 1.

FIG. 2 is a block diagram of the mobile phone 1.

As illustrated in FIG. 2, the mobile phone 1 is comprised of an antenna 11 through which radio-signals are transmitted and received, a modem 12 which modulates signals to be transmitted and demodulated received signals, a communication controller 13 which controls communication, a central processing unit (CPU) 14, a memory 15 storing various data and a program in accordance with which the central processing unit 14 operates, a display 16 comprised of a liquid crystal display device, an user interface 17 comprised of keys, dials, switches and so on through which a user inputs data into the central processing unit 14, a GPS signal processor 18 which processes GPS signals, and a GPS antenna 19 through which GPS signals are received from a GPS satellite (not illustrated).

The central processing unit 14 controls an operation of the communication controller 13, the memory 15, the display 16, the user interface 17, and the GPS signal processor 18.

For instance, the memory 15 is comprised of a semiconductor memory such as a read only memory (ROM), a random access memory (RAM) or an IC memory card, or a storage device such as a flexible disc, a hard disc or an optic magnetic disc.

The central processing unit 14 reads the program out of the memory 15, and executes the program. Thus, the central processing unit 14 operates in accordance with the program stored in the memory 15.

The GPS signal processor 18 demodulates GPS signals received from a GPS satellite through the GPS antenna 19. The mobile phone 1 carries out a process of finding a position thereof by receiving navigation messages included in the received GPS signals, or a process of finding a position thereof by receiving assistant or preliminary data corresponding to navigation message from a server located on a network.

In the former process, since the mobile phone 1 has to demodulate navigation messages out of GPS signals received from a GPS satellite, it takes at least 30 seconds for calculating a position of the mobile phone 1. In contrast, in the latter process, since the mobile phone 1 receives assistant data corresponding to navigation messages by making communication with the second server 4, it is not necessary for the mobile phone 1 to demodulate GPS signals, and thus, it takes just a few seconds to calculate a position of the mobile phone 1.

The GPS signal processor 18 can carry out three-dimensional position-finding in which a position is calculated through the use of four or more satellites, and two-dimensional position-finding in which a position is calculated in a circumference in which only three satellites can be captured, on the assumption that an altitude is equal to a predetermined altitude.

The GPS signal processor 18 carries out three-dimensional position-finding when the central processing unit 14 transmits an instruction to the GPS signal processor 18 to do so or when the GPS signal processor 18 receives altitude data from the second server 4, if the GPS signal processor 18 is successful in making communication with four or more GPS satellites. As an alternative, if the GPS signal processor 18 captures only three GPS satellites, the GPS signal processor 18 carries out two-dimensional position-finding.

Figure 3:
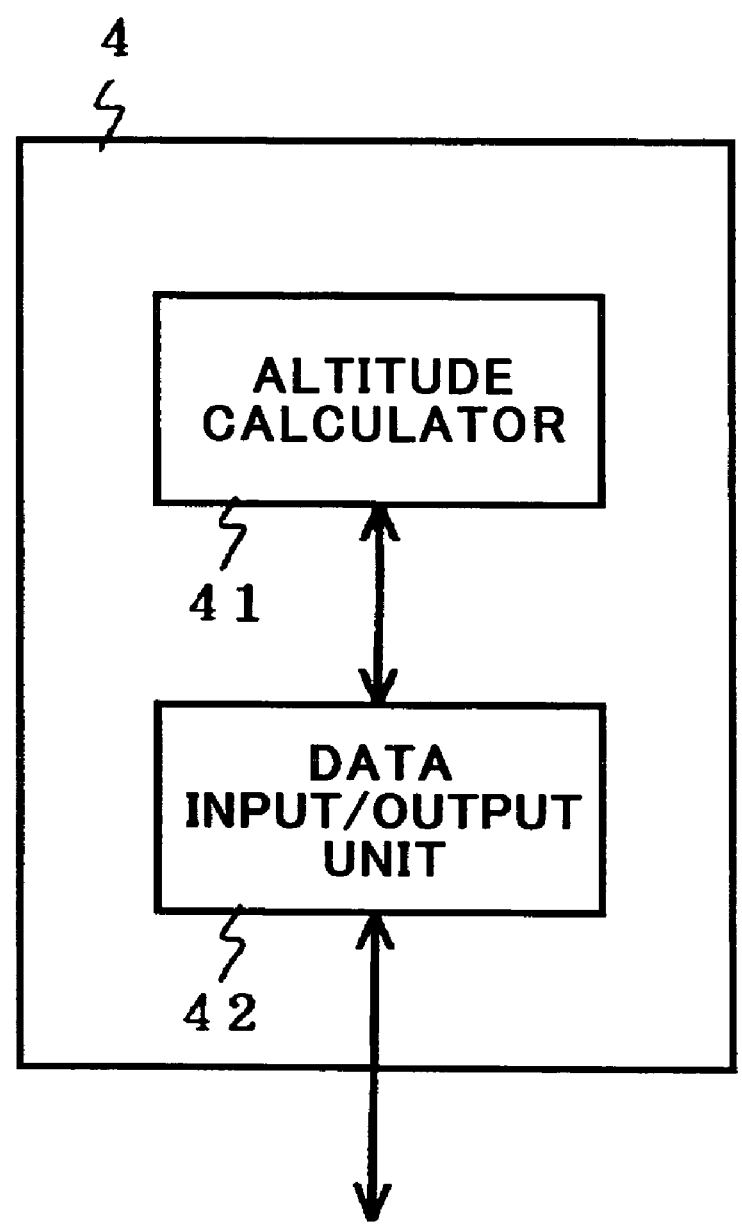
FIG. 3 is a block diagram of the second server used in the system illustrated in FIG. 1.

FIG. 3 is a block diagram of the second server 4.

As illustrated in FIG. 3, the second server 4 is comprised of an altitude calculator 41 and a data input/output unit 42.

The data input/output unit 42 receives terrain data of an area in which the mobile phone 1 is located, from the database 5 through the network 100, and transmits the thus received terrain data to the altitude calculator 41. The altitude calculator 41 calculates an altitude of the mobile phone 1, based on the received terrain data, and transmits the calculated altitude to the data input/output unit 42. The data input/output unit 42 transmits the altitude to the mobile phone 1 through the network 100.

Figure 4:
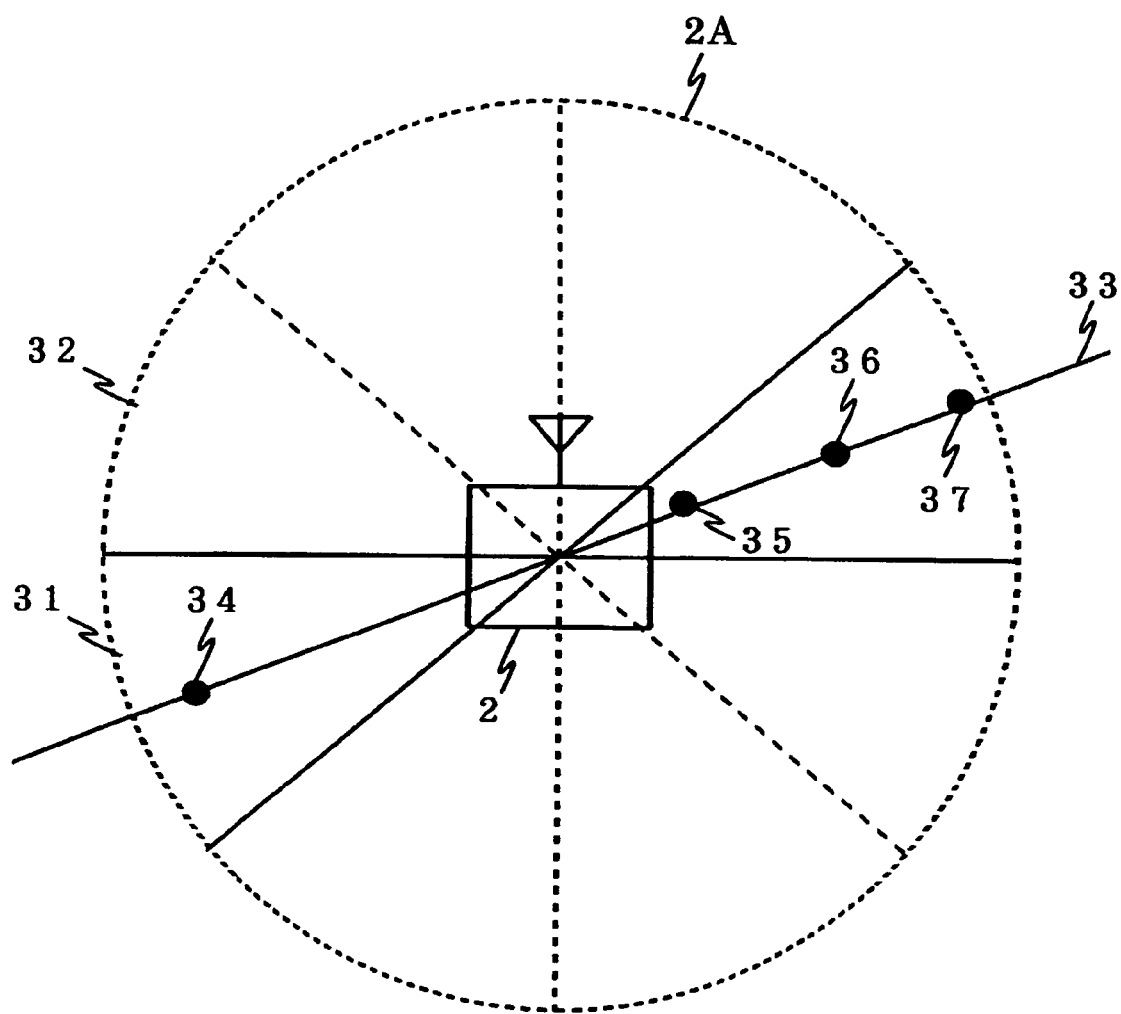
FIG. 4 illustrates cells in the first embodiment of the present invention.
Figure 5:
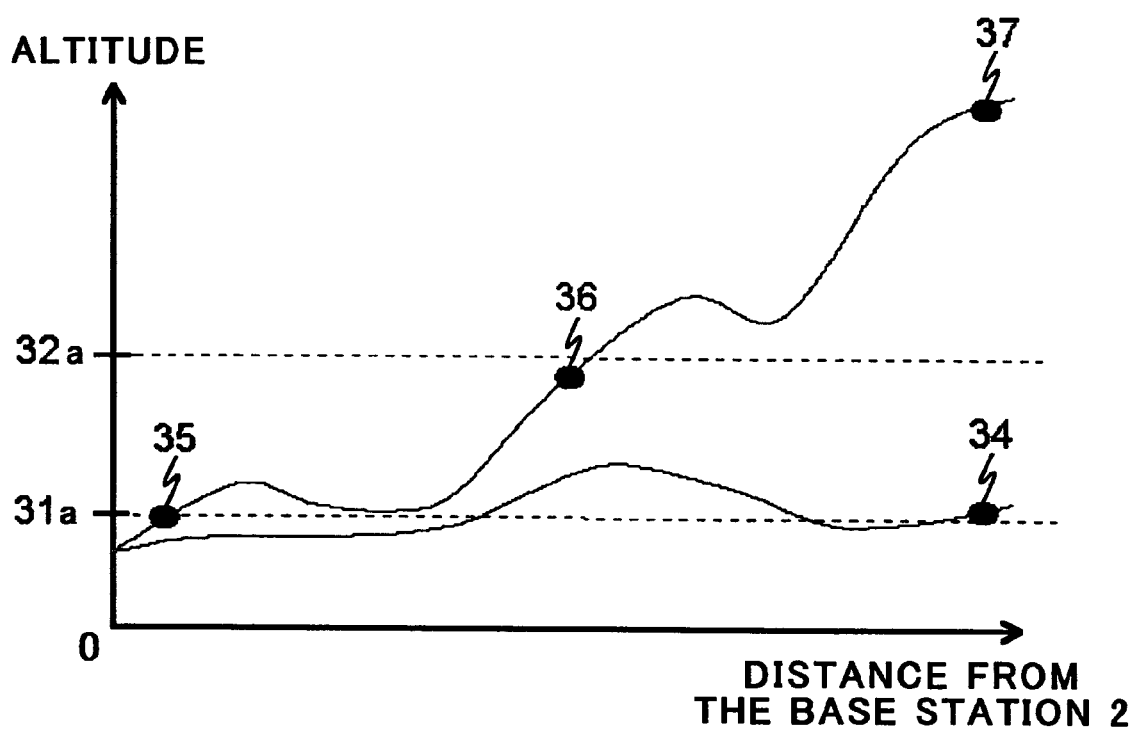
FIG. 5 shows altitudes of the points shown in FIG. 4.
Figure 6:
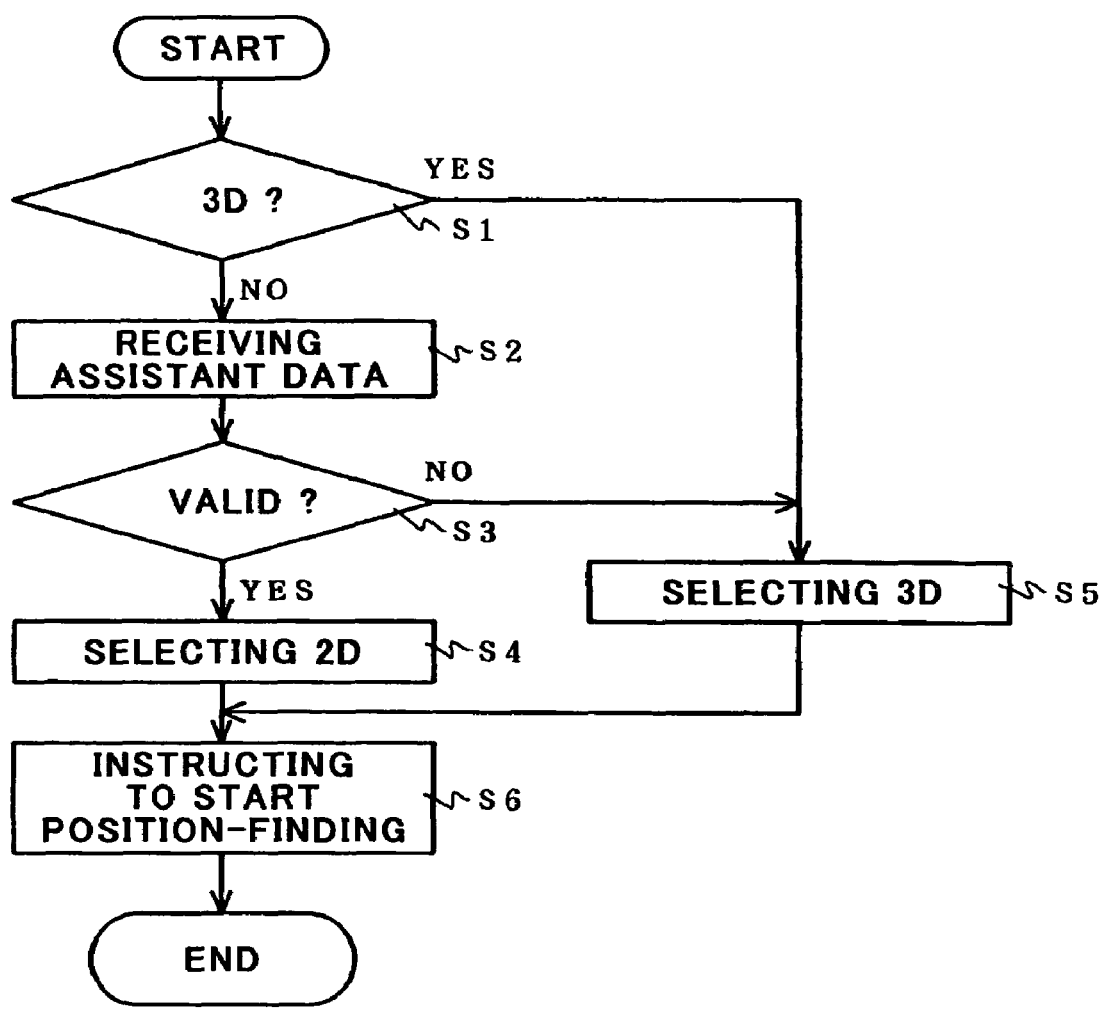
FIG. 6 is a flow-chart showing steps to be carried out by the mobile phone used in the system illustrated in FIG. 1.

FIG. 4 illustrates cells in the first embodiment, FIG. 5 shows altitudes of the points shown in FIG. 4, and FIG. 6 is a flow-chart showing steps to be carried out by the mobile phone 1.

Hereinbelow is explained an operation of the mobile phone 1 with reference to FIGS. 1 to 6. As mentioned earlier, the steps shown in FIG. 6 are carried out by the central processing unit 14 as a result of reading a program out of the memory 15.

If an event occurs in the mobile phone 1, the central processing unit 14 starts a process of finding a position of the mobile phone 1. Herein, an even is as follows, for instance:

a user of the mobile phone 1 handles the interface 17 through a menu displayed in the display 16; a predetermined date and time has come; and a call is received from a predetermined caller.

The mobile phone 1 is designed to find a position thereof in accordance with a first mode in which only three-dimensional position-finding is carried out or a second mode in which three-dimensional position-finding is carried out if four or more GPS satellites can be captured, or two-dimensional position-finding is carried out if only three GPS satellites can be captured. Which mode among the first and second modes is selected is instructed from a user when the mobile phone 1 starts a process of finding a position thereof, or is determined in advance.

On receipt of an instruction from a user, for instance, the central processing unit 14 judges whether three-dimensional position-finding is selected by a user, in step S1 in FIG. 6.

If three-dimensional position-finding is selected by a user (YES in step S1), the central processing unit 14 puts the mobile phone 1 into the first mode, in step S5, and instructs the GPS signal processor 18 to start a process of finding a position of the mobile phone 1, in step S6.

Then, a process of finding a position of the mobile phone 1 is carried out by the GPS signal processor 18. After the process was completed, the GPS signal processor 18 transmits data indicative of a position of the mobile phone 1 to the central processing unit 14. For instance, the data transmitted to the central processing unit 14 from the GPS signal processor 18 includes a latitude, a longitude, an altitude, and a velocity of the mobile phone 1.

If two-dimensional position-finding is selected by a user (NO in step S1), the central processing unit 14 makes access to the second server 4 through the communication controller 13, the modem 12, the antenna 11, the base station 2 and the network 100, and receives assistant data from the second server 4, in step S2.

The assistant data include not only "Ephemeris", "Almanac" and "Health" all included in navigation messages received from a GPS satellite, but also a coarse position of the mobile phone 1 calculated based on data relating to cells and/or the base station 2 to which the mobile phone 1 is registered, and GPS time used as a reference.

The above-mentioned coarse position includes not only two-dimensional data such as a latitude and a longitude, but also data indicative of an estimated altitude of the mobile phone 1. On receipt of a request from the mobile phone 1 to transmit assistant data to the mobile phone 1, the second server 4 makes access to the first server 3, and receives data about a cell in which the mobile phone 1 is located.

Then, the second server 4 makes access to the database 5, and receives a coarse position of the mobile phone 1, based on the cell data received from the first server 3. In general, a position and an altitude of the base station 2 or a central position and altitude of a cell is used as a coarse position and an estimated altitude of the mobile phone 1.

FIG. 4 illustrates an example of a positional relation between the base station 2, and first and second cells 31 and 32, and FIG. 5 shows a relation between distances from the base station 2 and altitudes of the points indicated in FIG. 4.

As illustrated in FIG. 4, the base station 2 covers a circular area 2A therearound. The circular area 2A is comprised of a lower half cell 31 and an upper half cell 32. It is assumed that the base station 2 is located at the base of a mountain, and the lower half cell 31 faces a plain, and the upper half cell 32 faces the mountain.

An imaginary line 33 passes through the base station 2. Points 34, 35, 36 and 37 are located on the imaginary line 33.

As illustrated in FIG. 5, the lower half cell 31 has an average altitude 31a, and the upper half cell 32 has an average altitude 32a. The points 34 and 35 have altitude almost equal to the average altitude 31a of the lower half cell 31. The point 36 has an altitude slightly smaller than the average altitude 32a of the upper half cell 32. The point 37 has an altitude higher than the average altitude 32a of the upper half cell 32.

When the mobile phone 1 is located on the imaginary line 33 in the lower half cell 31 facing a plain, an altitude of the base station 2 or the average altitude 31a of the lower half cell 31 may be used as an estimated altitude for carrying out two-dimensional position-finding.

As illustrated in FIG. 5, the points 35, 36 and 37 all located in the upper half cell 32 facing a mountain have altitudes quite different from one another. Hence, when the mobile phone 1 is located on the imaginary line 33 in the upper half cell 32, if an altitude of the base station 2 is used as an estimated altitude for carrying out two-dimensional position-finding, significant error is caused between the points 36 and 37, and if the average altitude 32a of the upper half cell 32 is used as an estimated altitude for carrying out two-dimensional position-finding, significant error is caused between the points 35 and 37.

As explained above, if an average altitude of a cell or an altitude of the base station 2 is used as an estimated altitude, two-dimensional position-finding is carried out, based on an estimated altitude having significant error. This results in significant error in a position (latitude and longitude) of the mobile phone 1.

Hence, if only three GPS satellites can be captured, it would be better to continue carrying out position-finding without using an estimated altitude, until three-dimensional position-finding can be carried out, through the position-finding may be carried out in a shorter period of time and in a smaller area than two-dimensional position-finding in which altitude data having low accuracy is used with the result of significant error in the results.

The database 5 transmits data indicative of a coarse position and an estimated altitude of the mobile phone 1 to the mobile phone 1, if there is almost no undulation in a cell such as the lower half cell 31, and hence, an average altitude such as the average altitude 31a of the lower half cell 31 may be used as an estimated altitude. In contrast, if the mobile phone 1 uses, as an estimated altitude, an average altitude of a cell having high undulation such as the upper half cell 32, there would be caused significant error in a calculated position of the mobile phone 1, in which case, the database 5 transmits data indicative only of a coarse position of the mobile phone 1 to the mobile phone 1, or the database 5 transmits data indicative of a coarse position and an estimated altitude of the mobile phone 1 to the mobile phone 1 together with a flag indicating that the estimated altitude is invalid.

When the second server 4 gets a coarse position of the mobile phone 1, the second server 4 transmits the coarse position to the mobile phone 1 together with other assistant data. If the second server 4 has an estimated altitude, the second server 4 transmits the estimated altitude to the mobile phone 1 together with a coarse position of the mobile phone 1.

On receipt of assistant data, the central processing unit 14 stores the received assistant data into the memory 15, and judges whether an estimated altitude is included in the received assistant data, and further whether an estimated altitude included in the received assistant data is valid, in step S3.

If an estimated altitude is included in the received assistant data, and the estimated altitude included in the received assistant data is valid (YES in step S3), the central processing unit 14 selects two-dimensional position-finding, in step S4.

If an estimated altitude is not included in the received assistant data, or the received assistant is accompanied with the flag indicating that the estimated altitude is invalid (NO in step S3), the central processing unit 14 selects three-dimensional position-finding, in step S5.

Then, the central processing unit 14 instructs the GPS signal processor 18 to start carrying out position-finding, in step S6.

After the process of finding a position of the mobile phone 1 was completed, the GPS signal processor 18 transmits data indicative of a position of the mobile phone 1 to the central processing unit 14.

In accordance with the first embodiment, accuracy of a received estimated altitude is calculated, based on terrain data, and if there is much variance between the estimated altitude and an actual altitude of the mobile phone 1, the central processing unit 14 does not use the estimated altitude, and hence, does not select two-dimensional position-finding. That is, the central processing unit 14 causes the GPS signal processor 18 to carry out three-dimensional position-finding. Thus, it is possible to prevent reduction in accuracy in finding a position of the mobile phone 1.

Second Embodiment

Figure 7:
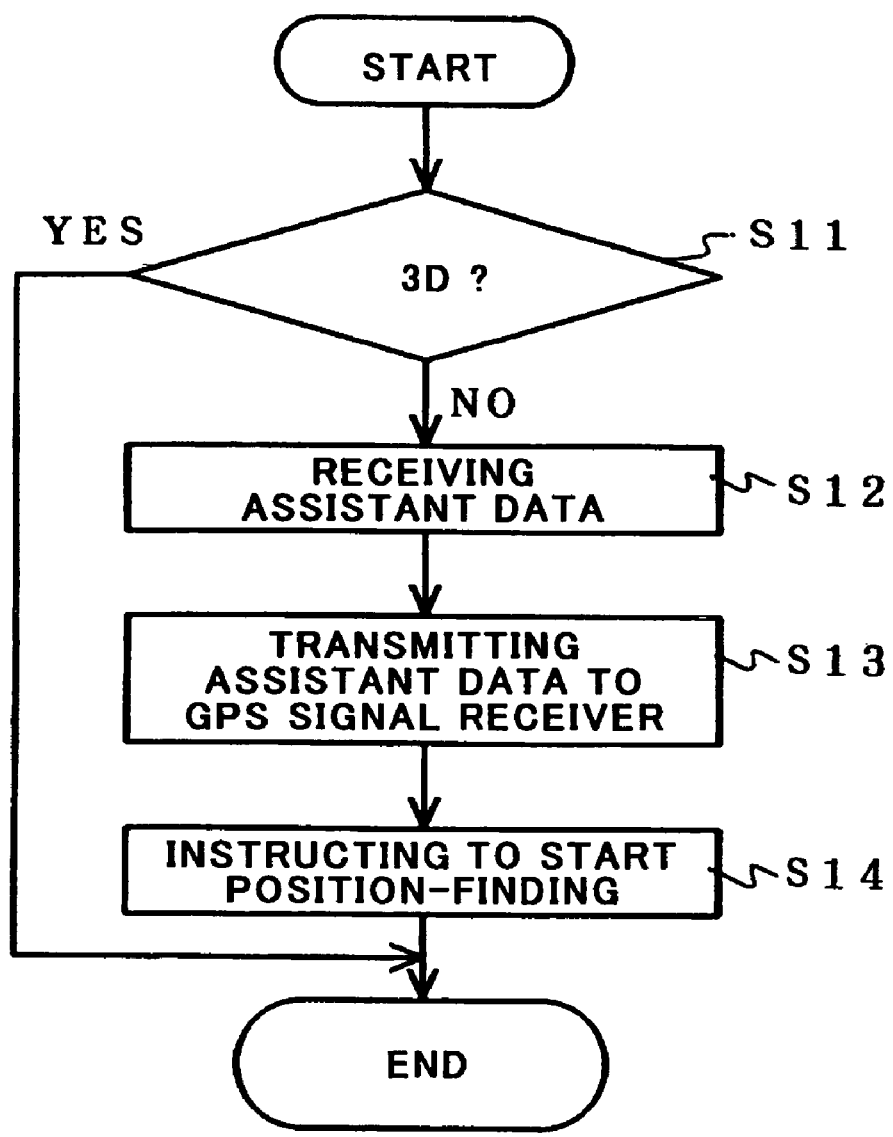
FIG. 7 is a flow-chart showing steps to be carried out by the mobile phone in the second embodiment of the present invention.
Figure 8:
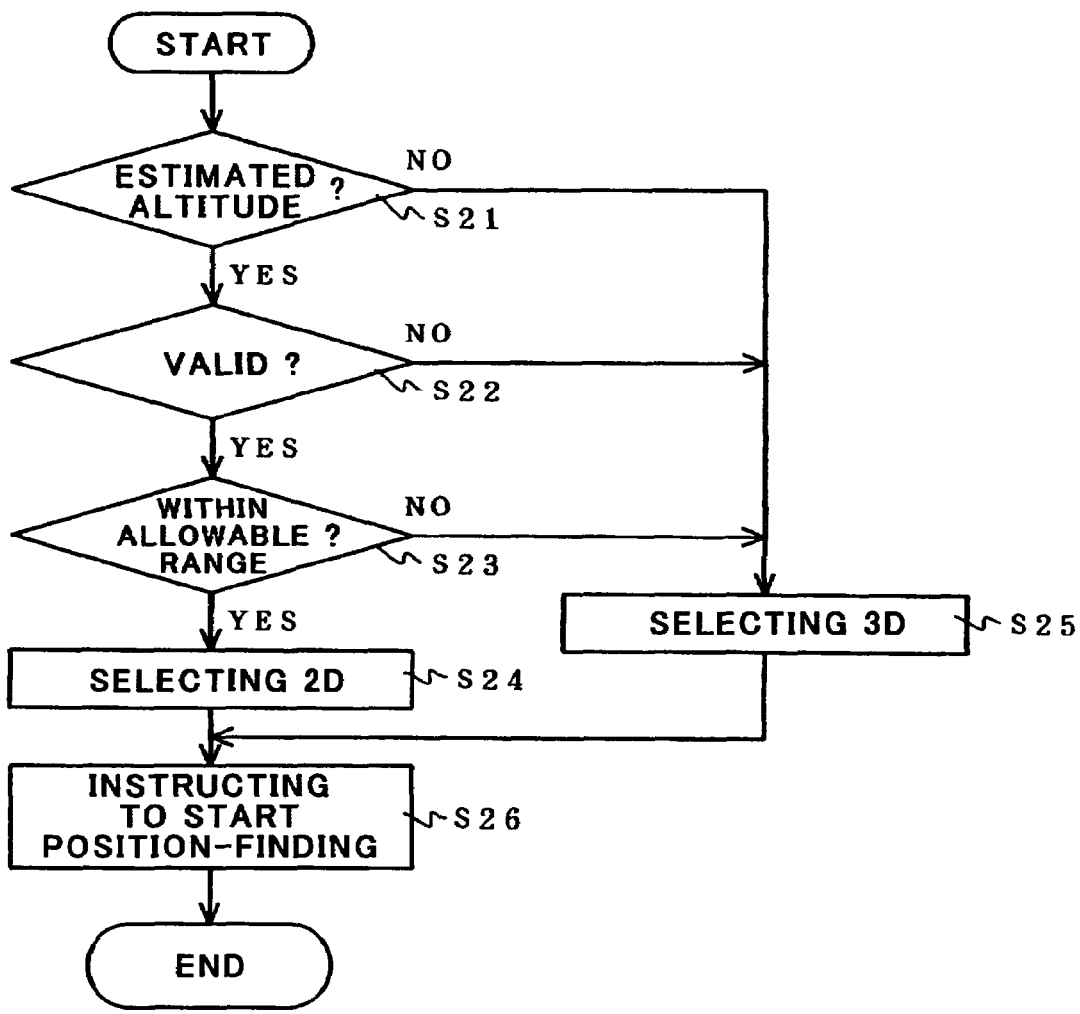
FIG. 8 is a flow-chart showing steps to be carried out by the mobile phone in the second embodiment of the present invention.

FIG. 7 is a flow-chart showing steps to be carried out by the central processing unit 14 in the mobile phone 1 in accordance with the second embodiment, and FIG. 8 is a flow-chart showing steps to be carried out by the GPS signal processor 18.

The system for finding a position of the mobile phone 1 in accordance with the second embodiment is identical with the system in accordance with the first embodiment.

In the above-mentioned first embodiment, accuracy of an estimated altitude is calculated in the second server 4. In the second embodiment, the GPS signal processor 18 judges whether two-dimensional position-finding is carried out such that accuracy of an estimated altitude required by a user or an application is ensured, based on an estimated altitude received from the second server 4.

On receipt of an instruction from a user, for instance, the central processing unit 14 judges whether three-dimensional position-finding is selected by a user, in step S11 in FIG. 7.

If three-dimensional position-finding is selected by a user (YES in step S11), the central processing unit 14 instructs the GPS signal processor 18 to start carrying out three-dimensional position-finding.

If two-dimensional position-finding is selected by a user (NO in step S11), the central processing unit 14 makes access to the second server 4 through the communication controller 13, the modem 12, the antenna 11, the base station 2 and the network 100, and receives assistant data from the second server 4, in step S12.

Then, the central processing unit 14 transmits the received assistant data to the GPS signal processor 18, in step S13, and instructs the GPS signal processor 18 to start carrying out two-dimensional position-finding, in step S14.

Then, the central processing unit 14 waits for data indicative of a position of the mobile phone 1, to be transmitted from the GPS signal processor 18.

On receipt of an instruction of starting position-finding from the central process unit 14, the GPS signal processor 18 judges whether an estimated altitude is received in the central processing unit 14, in step S21 in FIG. 8.

If the central processing unit 14 did not receive an estimated altitude (NO in step S21), the GPS signal processor 18 starts carrying out three-dimensional position-finding, in step S25.

If the central processing unit 14 received an estimated altitude (YES in step S21), the GPS signal processor 18 judges whether the estimated altitude is valid by checking that the estimated altitude is accompanied with the flag, in step S22.

If the GPS signal processor 18 judges the estimated altitude invalid (NO in step S22), the GPS signal processor 18 selects three-dimensional position-finding, in step S25, and starts carrying out three-dimensional position-finding, in step S26.

If the GPS signal processor 18 judges the estimated altitude valid (YES in step S22), the GPS signal processor 18 further judges whether the estimated altitude has accuracy which is within an allowable range, in step S23.

If the estimated altitude has accuracy within an allowable range (YES in step S23), the GPS signal processor 18 selects two-dimensional position-finding, in step S24, and starts carrying out two-dimensional position-finding, in step S26.

As data indicative of a coarse position and an estimated altitude, there are generally used a latitude, a longitude, accuracy or quality in a position, an estimated altitude and accuracy or quality in an altitude.

Accuracy in two-dimensional position-finding is dependent highly on accuracy of an estimated altitude. In the second embodiment, whether two-dimensional or three-dimensional position-finding is selected is determined in accordance with data indicative of accuracy of an estimated altitude.

In the second embodiment, an average altitude ALTave of a cell in which the mobile phone 1 is located is stored in the database 5 as data indicative of an estimated altitude. Accuracy ALTqua of an estimated altitude is calculated as follows, based on a maximum altitude ALTmax and a minimum altitude ALTmin in a cell.

IF (ABS(ALTmax−ALTave)≧ABS(ALTave−ALTmin))
ALTqua=ABS(ALTmax−ALTave)
ELSE
ALTqua=ABS((ALTave−ALTmin)

In the above-mentioned calculation, ABS(X) indicates a function for calculating an absolute value of X. In brief, a maximum in an error between an estimated altitude ALTave and a position of the mobile phone 1 in a cell is considered as accuracy ALTqua of an estimated altitude.

In calculation of the accuracy ALTqua of an estimated altitude, an allowable range Qua is determined in advance. If the accuracy ALTqua of an estimated altitude is within the allowable range Qua, the central processing unit 14 may select two-dimensional position-finding, and if the accuracy ALTqua of an estimated altitude is not within the allowable range Qua, the central processing unit 14 has to select three-dimensional position-finding. That is, the accuracy ALTqua of an estimated altitude is determined as follows.

IF (ALTQua<Qua)
Selecting two-dimensional position-finding
ELSE
Selecting three-dimensional position-finding The allowable range Qua may be determined by a user of the mobile phone 1 or in accordance with accuracy in a position, required by an application installed in the mobile phone 1. If high accuracy is required in a position of the mobile phone 1, the allowable range Qua is set relatively small to increase opportunities of finding a position of the mobile phone 1 by three-dimensional position-finding. The allowable range Qua is set relatively high, if opportunities of finding a position of the mobile phone 1 are to be increased or an area in which position-finding is carried out is to be extended, in which case, two-dimensional position-finding is carried out, and a position of the mobile phone 1 is calculated with low accuracy.

In accordance with the second embodiment, the GPS signal processor 18 selects whether two-dimensional or three-dimensional position-finding is to be carried out. Though the accuracy ALTqua of an estimated altitude in the second embodiment is calculated as a higher one among a difference between an average altitude and a maximum altitude in a cell, and a difference between an average altitude and a minimum altitude in a cell, it should be noted that other statistics values by which variance such as standard deviation can be calculated may be used as the accuracy ALTqua of an estimated altitude in place of the above-mentioned difference.

Third Embodiment

Figure 9:
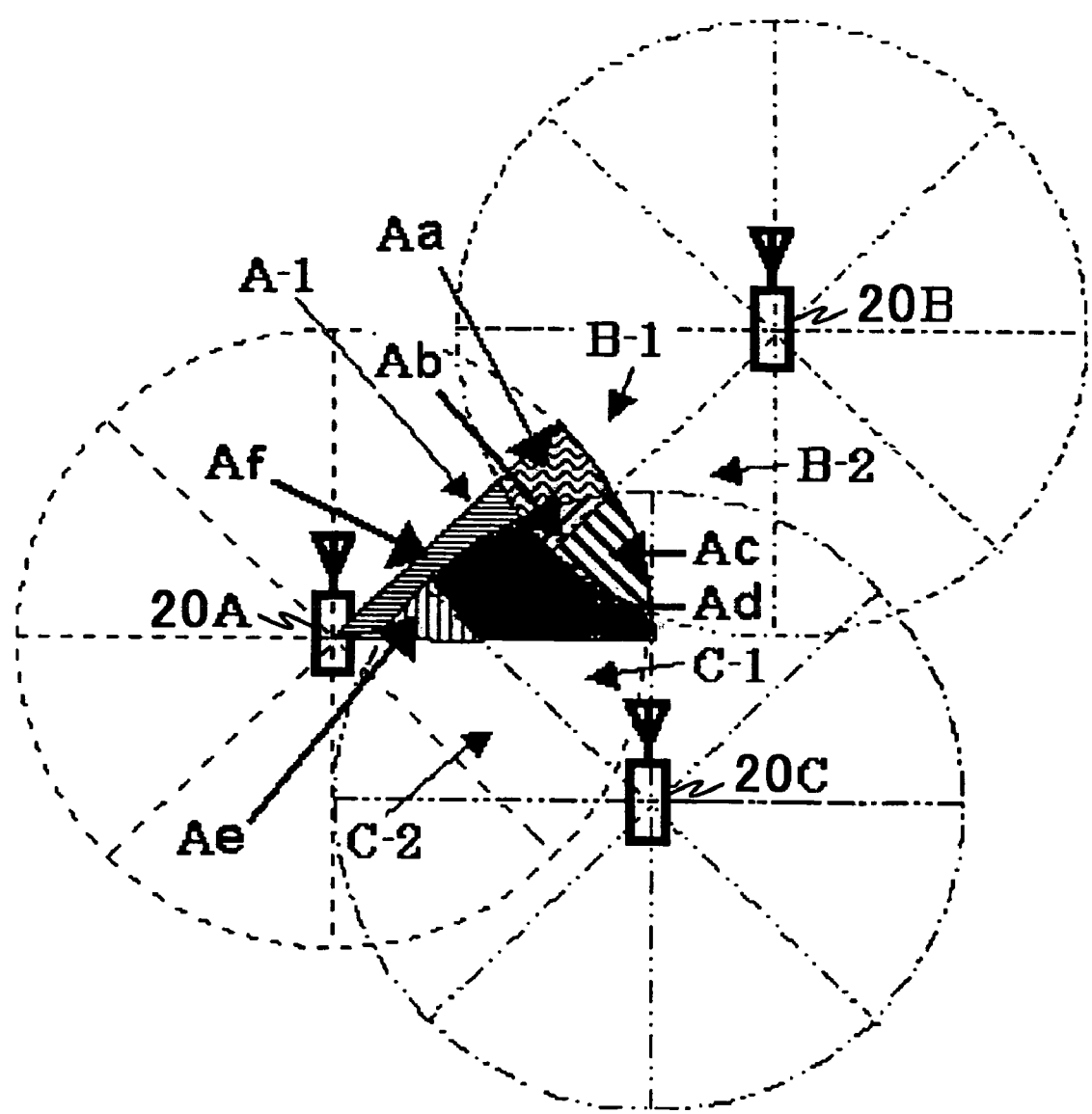
FIG. 9 illustrates a positional relation between a base station and cells in the third embodiment of the present invention.

FIG. 9 illustrates a positional relation between the base station 2 and cells in the third embodiment of the present invention.

In accordance with the third embodiment, the accuracy ALTqua of an estimated altitude provided from the database 5 is enhanced.

In the third embodiment, when the mobile phone 1 receives assistant data from the second server 4, the mobile phone 1 transmits data indicative of a base station or base stations which the mobile phone 1 captures, to the second server 4.

With reference to FIG. 9, in the third embodiment, the mobile phone 1 captures a base station(s) or a cell(s) determined in dependence on a location of the mobile phone 1 in a cell(s). This ensures that an estimated altitude in a smaller area can be calculated.

FIG. 9 illustrates an example in which the mobile phone 1 registered in a first base station 20A is located in a cell A-1.

If the mobile phone 1 is located in an area Aa, the mobile phone 1 captures a cell A-1 of the first base station 20A and a cell B-1 of a second base station 20B. If the mobile phone 1 is located in an area Ab, the mobile phone 1 captures a cell A-1 of the first base station 20A, a cell B-1 of the second base station 20B, and a cell C-1 of a third base station 20C. If the mobile phone 1 is located in an area Ac, the mobile phone 1 captures a cell A-1 of the first base station 20A, a cell B-2 of the second base station 20B, and a cell C-1 of the third base station 20C. If the mobile phone 1 is located in an area Ad, the mobile phone 1 captures a cell A-1 of the first base station 20A and a cell C-1 of the third base station 20C. If the mobile phone 1 is located in an area Ae, the mobile phone 1 captures a cell A-1 of the first base station 20A and a cell C-2 of the third base station 20C. If the mobile phone 1 is located in an area Af, the mobile phone 1 captures a cell A-1 of the first base station 20A.

The database 5 calculates an estimated altitude with high accuracy, based on terrain data in each of combinations of a base station(s) and a cell(s) captured by the mobile phone 1, and stores the thus calculated estimated altitude therein. Thus, it is possible to reduce an error in a position of the mobile phone 1 caused by an error in an altitude in two-dimensional position-finding.

Fourth Embodiment

Figure 10:
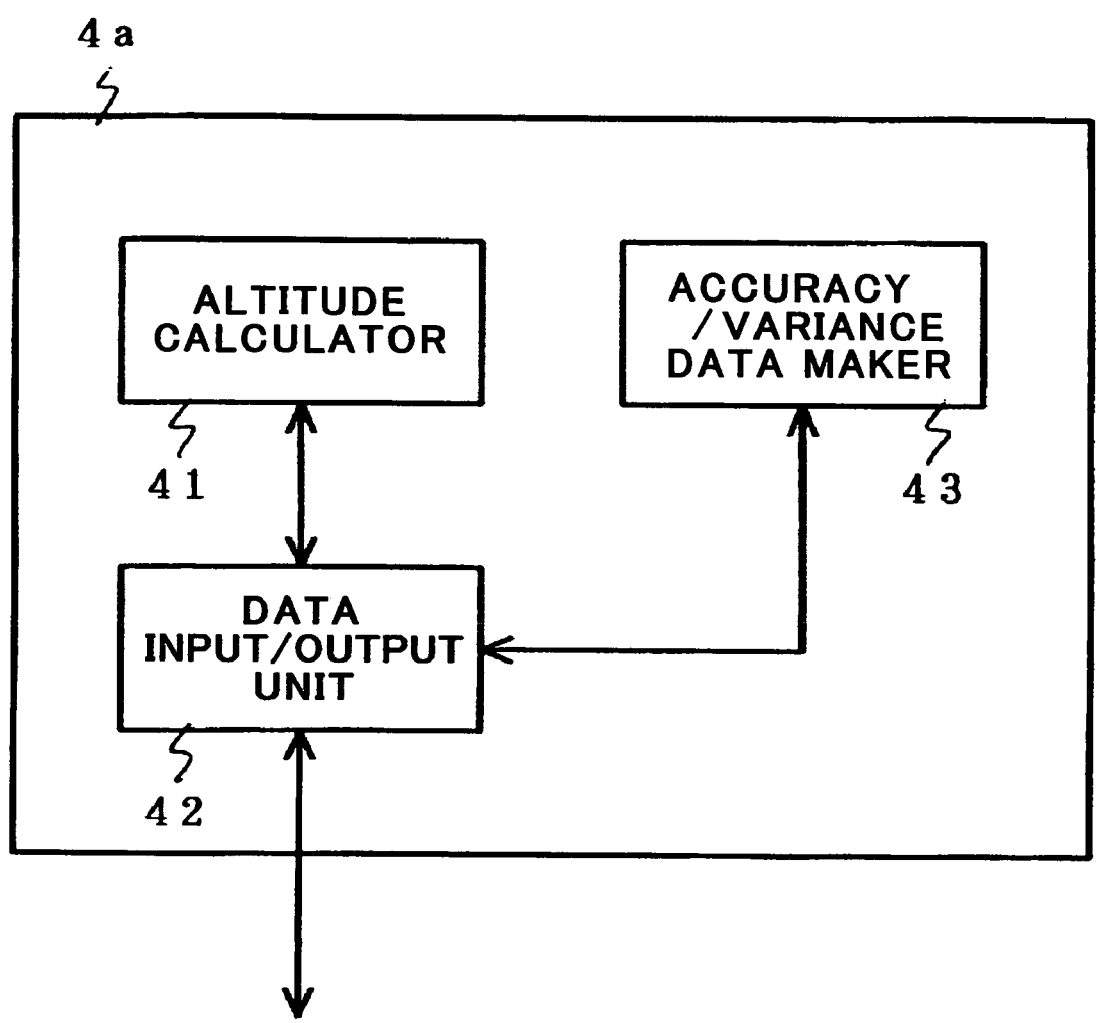
FIG. 10 is a block diagram of the second server in the fourth embodiment of the present invention.

FIG. 10 is a block diagram of the second server in the fourth embodiment of the present invention.

The second server 4*a* in the fourth embodiment is designed to further include an accuracy/variance data maker 43 in comparison with the second server 4 in the first embodiment, illustrated in FIG. 3.

The accuracy/variance data maker 43 calculates a profile of altitude in an area in which the mobile phone 1 is located, based on terrain data provided from the database 5, and makes accuracy/variance data indicative of accuracy or variance in altitude data, based on the calculated altitude profile. The accuracy/variance data is transmitted to the data input/output unit 42.

The data input/output unit 42 receives terrain data of an area in which the mobile phone 1 is located, from the altitude calculator 41, and accuracy/variance data indicative of accuracy or variance in altitude data, from the accuracy/variance data maker 43, and transmits the received terrain data and accuracy/variance data to the mobile phone 1 through the network 100.

In accordance with the fourth embodiment, since accuracy/variance data indicative of accuracy or variance in altitude data is made based on terrain data of an area in which the mobile phone 1 is located, it would be possible to readily know whether there is much variance between an estimated altitude and an actual altitude.

Fifth Embodiment

Figure 11:
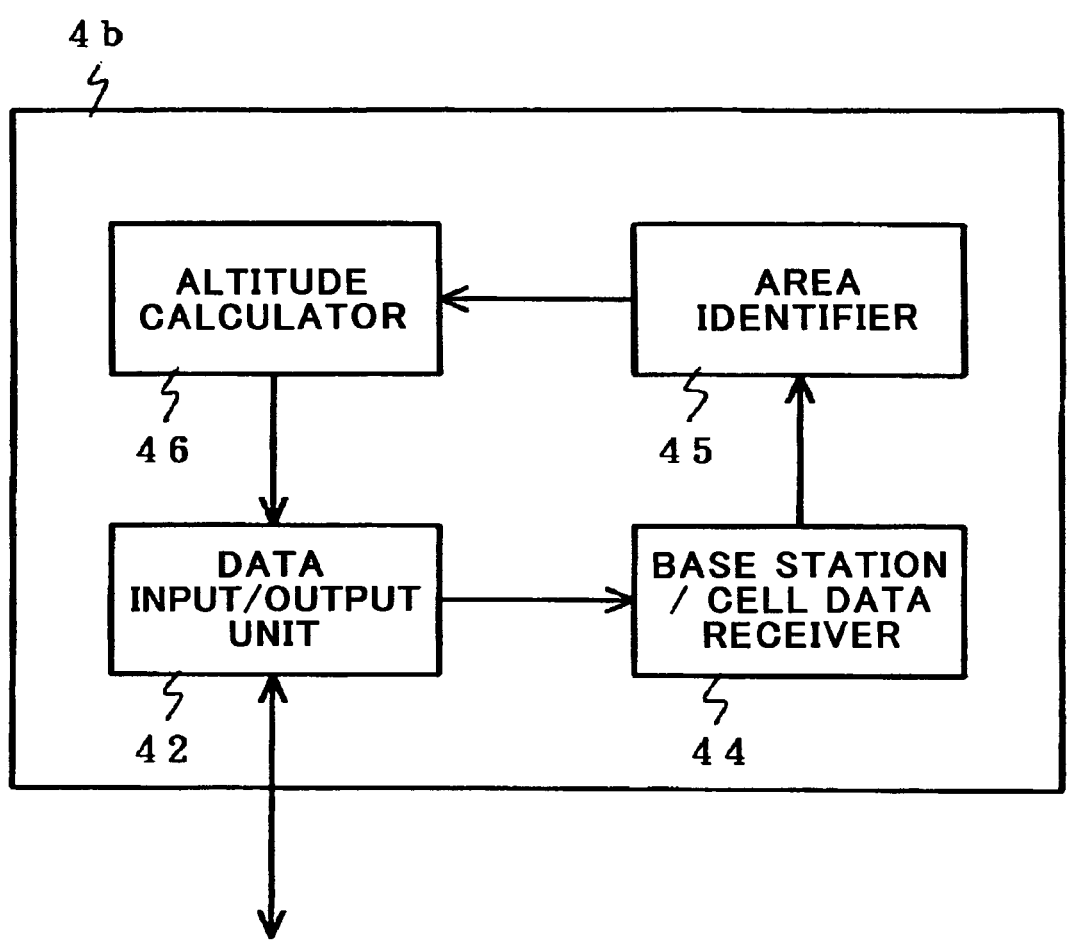
FIG. 11 is a block diagram of the second server in the fifth embodiment of the present invention.

FIG. 11 is a block diagram of the second server in the fifth embodiment of the present invention.

As illustrated in FIG. 11, the second server 4*b* in the fifth embodiment is comprised of a data input/output unit 42, a base station/cell data receiver 44, an area identifier 45, and an altitude calculator 46.

The data input/output unit 42 has the same structure and functions as those of the data input/output unit 42 in the first embodiment, illustrated in FIG. 3.

The base station/cell data receiver 44 receives data indicative of a plurality of base stations or cells which the mobile phone 1 captures, through the data input/output unit 42, and transmits the received data to the area identifier 45.

The area identifier 45 identifies an area or areas covered by the base stations or cells indicated in the data received from the base station/cell data receiver 44.

The altitude calculator 46 calculates an altitude of the mobile phone 1 in the area identified by the area identifier 45.

In the above-mentioned third embodiment, data indicative of an estimated altitude with high accuracy is made in the database 5. In the fifth embodiment, data indicative of an estimated altitude with high accuracy is made in the second server 4*b*, ensuring that an error in a calculated position of the mobile phone 1, caused by an error in an estimated altitude, can be reduced in two-dimensional position-finding.

Sixth Embodiment

Figure 12:
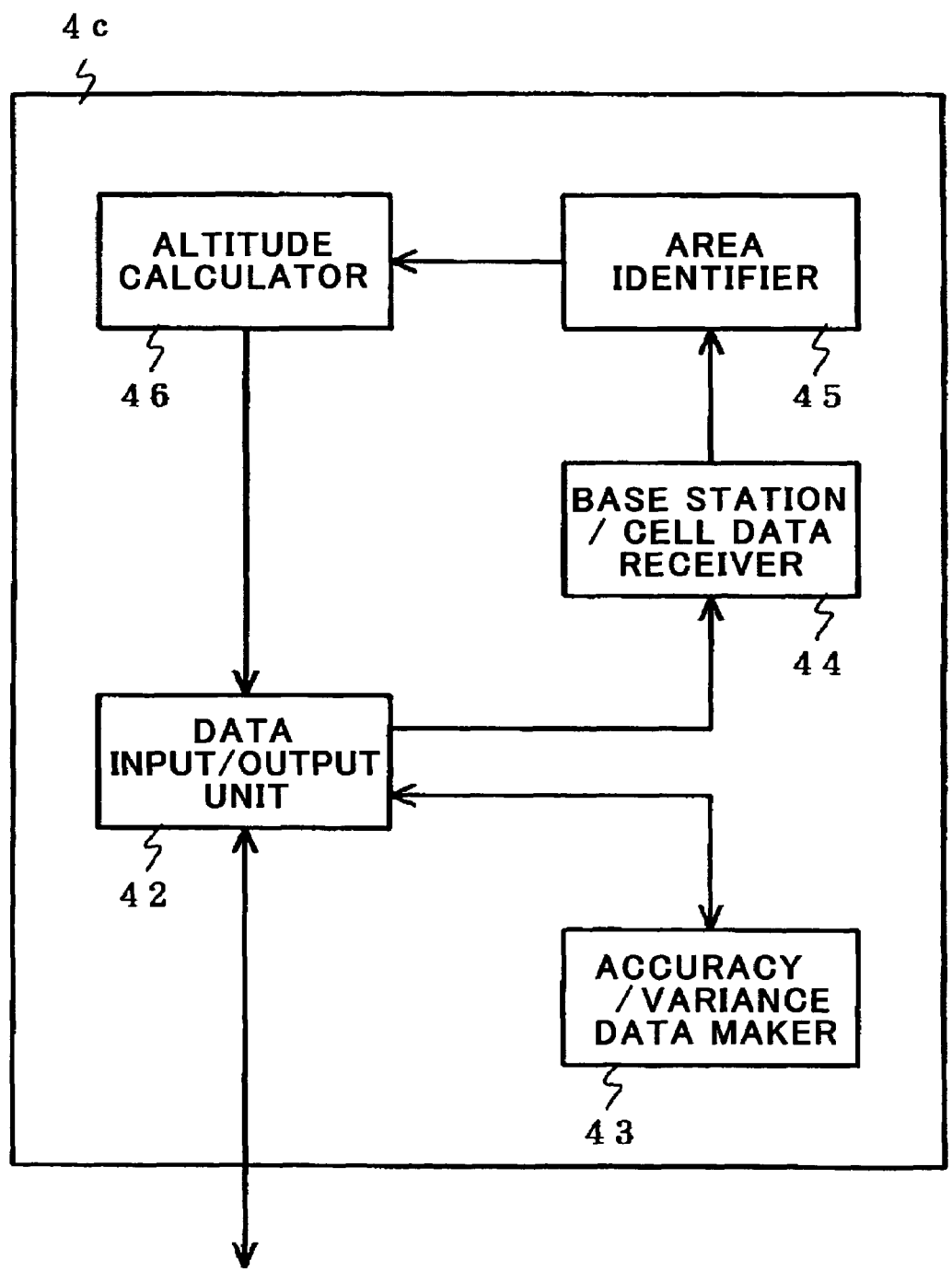
FIG. 12 is a block diagram of the second server in the sixth embodiment of the present invention.

FIG. 12 is a block diagram of the second server in the sixth embodiment of the present invention.

The second server 4*c* in the sixth embodiment is designed to further include an accuracy/variance data maker 43 in comparison with the second server 4*b* in the fifth embodiment, illustrated in FIG. 5. The accuracy/variance data maker 43 in the sixth embodiment has the same structure and functions as those of the accuracy/variance data maker 43 in the fourth embodiment. Hence, the sixth embodiment can provide the advantages provided by the fourth embodiment as well as the advantages provided by the fifth embodiment.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2003-381889 filed on Nov. 12, 2003 including specification, claims, drawings and summary is incorporated herein by reference in its entirety.

What is claimed is:

1. A position-finding system comprising:
a terminal having a global positioning system (GPS) for finding a position thereof; and
a server which calculates an altitude of said terminal, based on terrain data in an area in which said terminal is,
said terminal including a controller which selects one of three-dimensional position-finding in which a position is calculated through the use of four or more satellites and two-dimensional position-finding in which a position is calculated in a circumference in which only three satellites can be captured, in accordance with said altitude data provided from said server,
wherein said controller selects one of said three-dimensional position-finding and said two-dimensional position-finding in accordance with accuracy of said altitude data.

2. The position-finding system as set forth in claim 1, wherein said server is comprised of a first device which acquires information relating to a plurality of base stations/cells which are captured by said terminal, and a second device which makes altitude data relating to an area covered by said plurality of base stations/cells.

3. The position-finding system as set forth in claim 1, wherein said server further includes a third device which calculates a profile of altitude in an area, based on said terrain data, and makes accuracy/variance data indicative of accuracy or variance of said altitude data, based on said profile of altitude.

4. The position-finding system as set forth in claim 1, wherein said controller selects one of said three-dimensional position-finding and said two-dimensional position-finding in accordance with whether there is said altitude data or not.

5. The position-finding system as set forth in claim 1, wherein said controller judges accuracy of said altitude data, based on predetermined standard, and selects one of said three-dimensional position-finding and said two-dimensional position-finding in accordance with the result of judgement.

6. The position-finding system as set forth in claim 5, wherein said controller uses a difference between said altitude data and maximum or minimum altitude in a cell in which said terminal is, as said predetermined standard.

7. The position-finding system as set forth in claim 1, wherein said controller selects said three-dimensional position-finding when a position of said terminal is to be found only by said global positioning system.

8. The position-finding system as set forth in claim 1, wherein said terminal is comprised of a mobile phone.

9. A server constituting a position-finding system together with a terminal having a global positioning system (GPS) for finding a position thereof,
wherein said server calculates altitude data, based on terrain data in an area in which said terminal is, and
said terminal selects one of three-dimensional position-finding in which a position is calculated through the use of four or more satellites and two-dimensional position-finding in which a position is calculated in a circumference in which only three satellites can be captured, in accordance with said altitude data provided from said server,
wherein said controller selects one of said three-dimensional position-finding and said two-dimensional position-finding in accordance with accuracy of said altitude data.

10. The server as set forth in claim 9, wherein said server is comprised of a first device which acquires information relating to a plurality of base stations/cells which are captured by said terminal, and a second device which makes altitude data relating to an area covered by said plurality of base stations/cells.

11. The server as set forth in claim 9, wherein said server includes a third device which calculates a profile of altitude in an area, based on said terrain data, and makes accuracy/variance data indicative of accuracy or variance of said altitude data, based on said profile of altitude.

12. A mobile terminal having a global positioning system (GPS) for finding a position thereof, comprising a controller which selects one of three-dimensional position-finding in which a position is calculated through the use of four or more satellites and two-dimensional position-finding in which a position is calculated in a circumference in which only three satellites can be captured, in accordance with altitude data calculated based on terrain data in an area in which said mobile terminal is.

13. The mobile terminal as set forth in claim 12, wherein said controller selects one of said three-dimensional position-finding and said two-dimensional position-finding in accordance with whether there is said altitude data or not.

14. The mobile terminal as set forth in claim 12, wherein said controller judges accuracy of said altitude data, based on predetermined standard, and selects one of said three-dimensional position-finding and said two-dimensional position-finding in accordance with the result of judgement.

15. The mobile terminal as set forth in claim 14, wherein said controller uses a difference between said altitude data and maximum or minimum altitude in a cell in which said terminal is, as said predetermined standard.

16. The mobile terminal as set forth in claim 12, wherein said controller selects said three-dimensional position-finding when a position of said mobile terminal is to be found only by said global positioning system.

17. The mobile terminal as set forth in claim 12, wherein said mobile terminal is comprised of a mobile phone.

18. A GPS receiver having a global positioning system (GPS) for finding a position thereof, comprising:
a controller which selects one of three-dimensional position-finding in which a position is calculated through the use of four or more satellites and two-dimensional position-finding in which a position is calculated in a circumference in which only three satellites can be captured, in accordance with altitude data calculated based on terrain data in an area in which said GPS receiver is; and
a database which stores minimum and maximum altitude information of a plurality of cells, wherein said controller uses a difference between said altitude data and said maximum and minimum altitude in a cell in which said terminal is, as a predetermined standard in determining whether or not to select three-dimensional position-finding or two-dimensional position finding.

19. The GPS receiver as set forth in claim 18, wherein said controller selects one of said three-dimensional position-finding and said two-dimensional position-finding in accordance with whether there is said altitude data or not.

20. The GPS receiver as set forth in claim 18, wherein said controller selects one of said three-dimensional position-finding and said two-dimensional position-finding in accordance with accuracy of said altitude data.

21. The GPS receiver as set forth in claim 18, wherein said controller judges accuracy of said altitude data, based on predetermined standard, and selects one of said three-dimensional position-finding and said two-dimensional position-finding in accordance with the result of judgment.

22. The GPS receiver as set forth in claim 18, wherein said controller selects said three-dimensional position-finding when a position of said GPS receiver is to be found only by said global positioning system.

23. A method of finding a position of a terminal in a position-finding system comprised of said terminal and a server,
said terminal including a global positioning system (GPS) for finding a position thereof; and a controller which selects one of three-dimensional position-finding in which a position is calculated through the use of four or more satellites and two-dimensional position-finding in which a position is calculated in a circumference in which only three satellites can be captured,
said method comprising:
(a) calculating altitude data, based on terrain data in an area in which said terminal is, said step (a) being to be carried out by said server; and
(b) selecting one of said three-dimensional position-finding and said two-dimensional position-finding in accordance with said altitude data, said step (b) being to be carried out by said terminal,
wherein said three-dimensional position-finding and said two-dimensional position-finding is selected in said step (b) in accordance with accuracy of said altitude data.

24. The method as set forth in claim 23, wherein said three-dimensional position-finding and said two-dimensional position-finding is selected in said step (b) in accordance with whether there is said altitude data or not.

25. The method as set forth in claim 23, further comprising (c) judging accuracy of said altitude data, based on predetermined standard, and wherein said three-dimensional position-finding and said two-dimensional position-finding is selected in said step (b) in accordance with the result of judgment.

26. The method as set forth in claim 25, wherein a difference between said altitude data and maximum or minimum altitude in a cell in which said terminal is located is used as said predetermined standard.

27. The method as set forth in claim 23, wherein said three-dimensional position-finding is always selected in said step (b) when a position of said terminal is to be found only by said global positioning system.

28. A program for causing a controller equipped in a terminal to find a position thereof in a position-finding system comprised of said terminal and a server,
said terminal including a global positioning system (GPS) for finding a position thereof;
said controller selecting one of three-dimensional position-finding in which a position is calculated through the use of four or more satellites and two-dimensional position-finding in which a position is calculated in a circumference in which only three satellites can be captured,
said server calculating altitude data, based on terrain data in an area in which said terminal is,
steps executed by said controller in accordance with said program including selecting one of said three-dimensional position-finding and said two-dimensional position-finding in accordance with said altitude data provided from said server,
wherein said three-dimensional position-finding and said two-dimensional position-finding is selected in accordance with accuracy of said altitude data.

29. The program as set forth in claim 28, wherein said three-dimensional position-finding and said two-dimensional position-finding is selected in accordance with whether there is said altitude data or not.

30. The program as set forth in claim 28, wherein said steps further include judging accuracy of said altitude data, based on predetermined standard, and wherein said three-dimensional position-finding and said two-dimensional position-finding is selected in accordance with the result of judgement.

31. The program as set forth in claim 30, wherein a difference between said altitude data and maximum or minimum altitude in a cell in which said terminal is located is used as said predetermined standard.

32. The program as set forth in claim 28, wherein said three-dimensional position-finding is always selected when a position of said terminal is to be found only by said global positioning system.

33. The position-finding system as set forth in claim 1, wherein said server is comprised of a first device which acquires information relating to a plurality of base stations/cells which are captured by said terminal, and a second device which makes altitude data relating to an area covered by said plurality of base stations/cells and stores the altitude data in a database in which map data of the area covered by said plurality of base/stations/cells is already stored therein, and
wherein the maximum or minimum altitude in a cell is obtained from the map data stored in the database.

34. The server as set forth in claim 9, wherein said server is comprised of a first device which acquires information relating to a plurality of base stations/cells which are captured by said terminal, and a second device which makes altitude data relating to an area covered by said plurality of base stations/cells and stores the altitude data in a database in which map data of the area covered by said plurality of base/stations/cells is already stored therein, and
wherein the maximum or minimum altitude in a cell is obtained from the map data stored in the database.

35. The method as set forth in claim 23, further comprising:
storing the altitude data obtained in step (a) in a database in which map data of the area covered by a plurality of base/stations/cells is already stored therein, and
wherein the maximum or minimum altitude in a cell is obtained from the map data stored in the database.

* * * * *